United States Patent [19]

Nazemi

[11] Patent Number: 4,618,960
[45] Date of Patent: Oct. 21, 1986

[54] GAS LASER WITH ACOUSTIC BAFFLE

[75] Inventor: Said Nazemi, Belmont, Mass.

[73] Assignee: Laser Science, Inc., Cambridge, Mass.

[21] Appl. No.: 573,003

[22] Filed: Jan. 23, 1984

[51] Int. Cl.4 ............................................... H01S 3/22
[52] U.S. Cl. ...................................... 372/58; 372/87; 372/61; 372/55
[58] Field of Search ............... 376/58, 61, 55; 372/89, 372/90, 87

[56] References Cited

U.S. PATENT DOCUMENTS 4,457,000  6/1984  Rao ....................................... 372/89

Primary Examiner—Leon Scott, Jr.
Attorney, Agent, or Firm—E. Thorpe Barrett

[57] ABSTRACT

A gas laser having an outer conductive shell and two axially displaced spaced plastic cylinders mounted within the shell. The inner plastic cylinder supports the high voltage components to produce a transverse electrical discharge. The outer plastic cylinder is spaced from the outer shell by rubber feet and forms an acoustic baffle to decrease the noise radiated during operation. High speed fans circulate the laser gas around the annular path between the two cylinders and between the high voltage electrodes. The inner plastic cylinder is manually removable for repair or other reason and carries with it all of the electrical components within the outer shell. High voltage is fed to the high voltage electrodes by means of a circuit that does not include the outer shell. This arrangement minimizes operating noise, provides maximum safety for operating personnel, and minimizes electrical interference.

7 Claims, 6 Drawing Figures

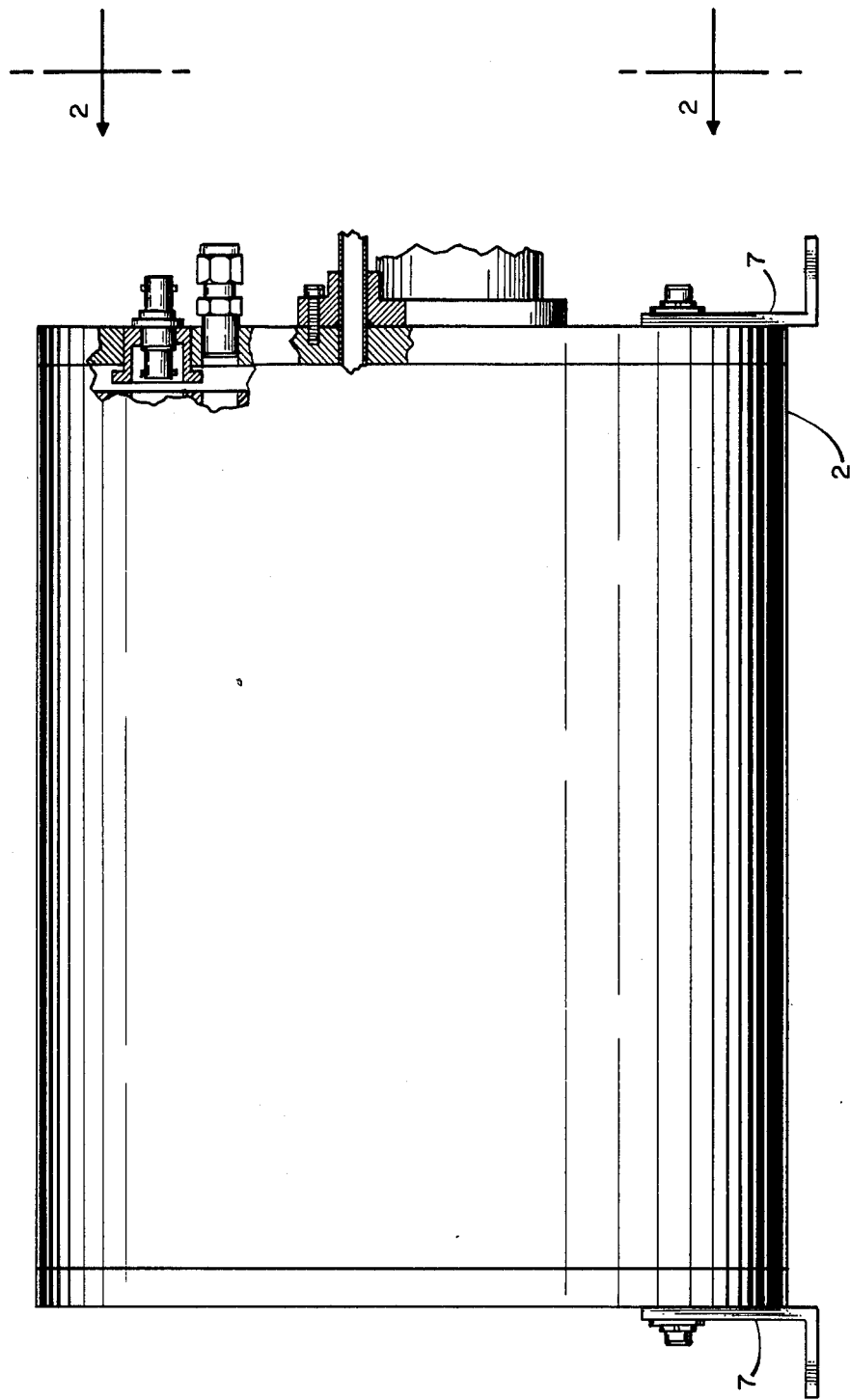

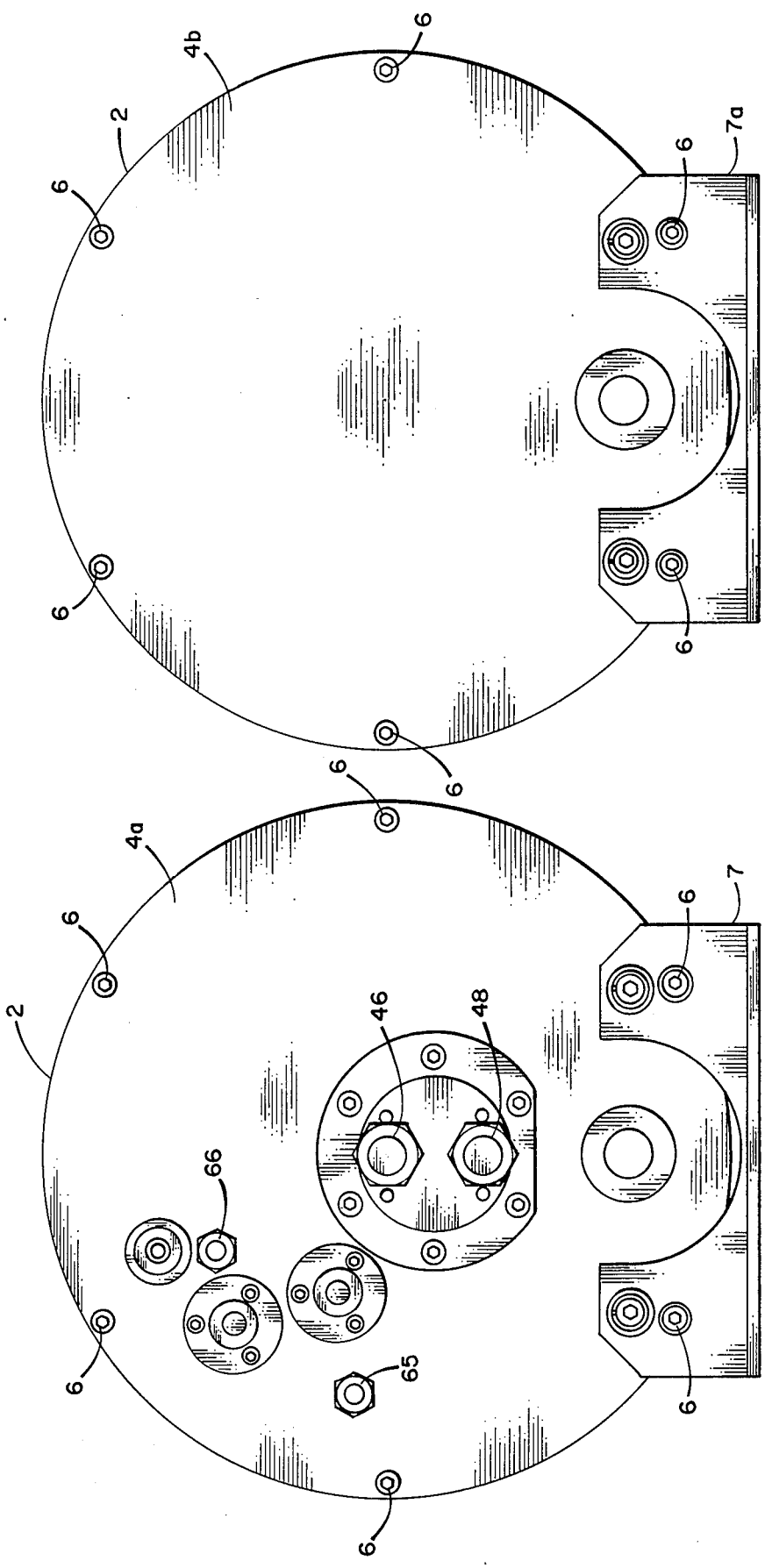

GAS LASER WITH ACOUSTIC BAFFLE

BACKGROUND OF THE INVENTION

1. Field of the Invention

This invention relates to gas lasers and more particularly to pulsed lasers having high stability, medium power, closed cycle or continuous gas feed operation, and capable of high pulse repetition rates.

2. Description of the Prior Art

Many configurations of gas lasers have been developed over the past twenty years, but each of these differs in a number of material respects from the structure and method disclosed here. A gas-efficient laser capable of operation at high pulse repetition rates is described in Review of Scientific Instruments 53(4) 1982 in an article entitled "High-repetition rate, recirculating hydrogen fluoride/deuterium fluoride laser" by R. I. Rudko, Z. Drozdowicz, and S. Linhares. In that laser the plasma chamber is housed in an aluminum cylinder. One of the high-voltage electrodes, the anode, is mounted on a plastic cylinder positioned within the plasma chamber and having its longitudinal axis offset from the longitudinal axis of the outer shell. The cathode is postioned opposite the anode and is connected to the aluminum outer shell. The anode and cathode are positioned at the narrowest part of the annular passageway between the two cylinders. One or more fans circulate the gas in the laser around the annular path. Because of the physical configuration, the highest gas velocity occurs in the region between the cathode and anode. A steady flow of fresh gas is maintained through the plasma chamber.

SUMMARY OF THE INVENTION

The invention is embodied in a carbon dioxide laser having the requisite features to produce stable laser output pulses with medium power and high pulse repetition rates. The body of the plasma chamber includes two plastic cylinders: an outer sound baffle cylinder and an inner support cylinder on which the electrodes and other operating elements are mounted. The two plastic cylinders are positioned with offset longitudinal axes so that the minimum distance between the cylinders occurs in the vicinity of the high-voltage electrodes. An outer metal shell or housing encloses the plasma chamber, but is not connected to the high-voltage circuits. All of the internal electrical components are mounted on the inner support cylinder which is removable to provide for quick and easy replacement or repair of the electrode structures. Three high-velocity fans, operating on 400 Hertz current, produce a flow of gas around the annular path between the two cylinders, with maximum velocity occuring in the area between the two high-voltage electrodes. The fans rapidly clear and replace the gas between the electrodes and also produce a differential gas pressure that forces a portion of the gas through a regeneration system.

The outer baffle cylinder serves both to direct the flow of gas with maximum velocity in the electrode area and to reduce significantly the emission of audio noise produced by the plasma discharge. Both of the plastic cylinders are contained within the separate metal housing which does not form part of the high-voltage circuits. This arrangement provides maximum safety and significantly reduces electro-magnetic interference.

BRIEF DESCRIPTION OF THE DRAWING

FIG. 1 is an external side view, shown partly in section, of a laser system embodying the invention;

FIG. 2 is an end view along line 2—2 of FIG. 1;

FIG. 3 shows the opposite end of the laser of FIG. 1;

DESCRIPTION OF THE PREFERRED EMBODIMENT

Figure 4:
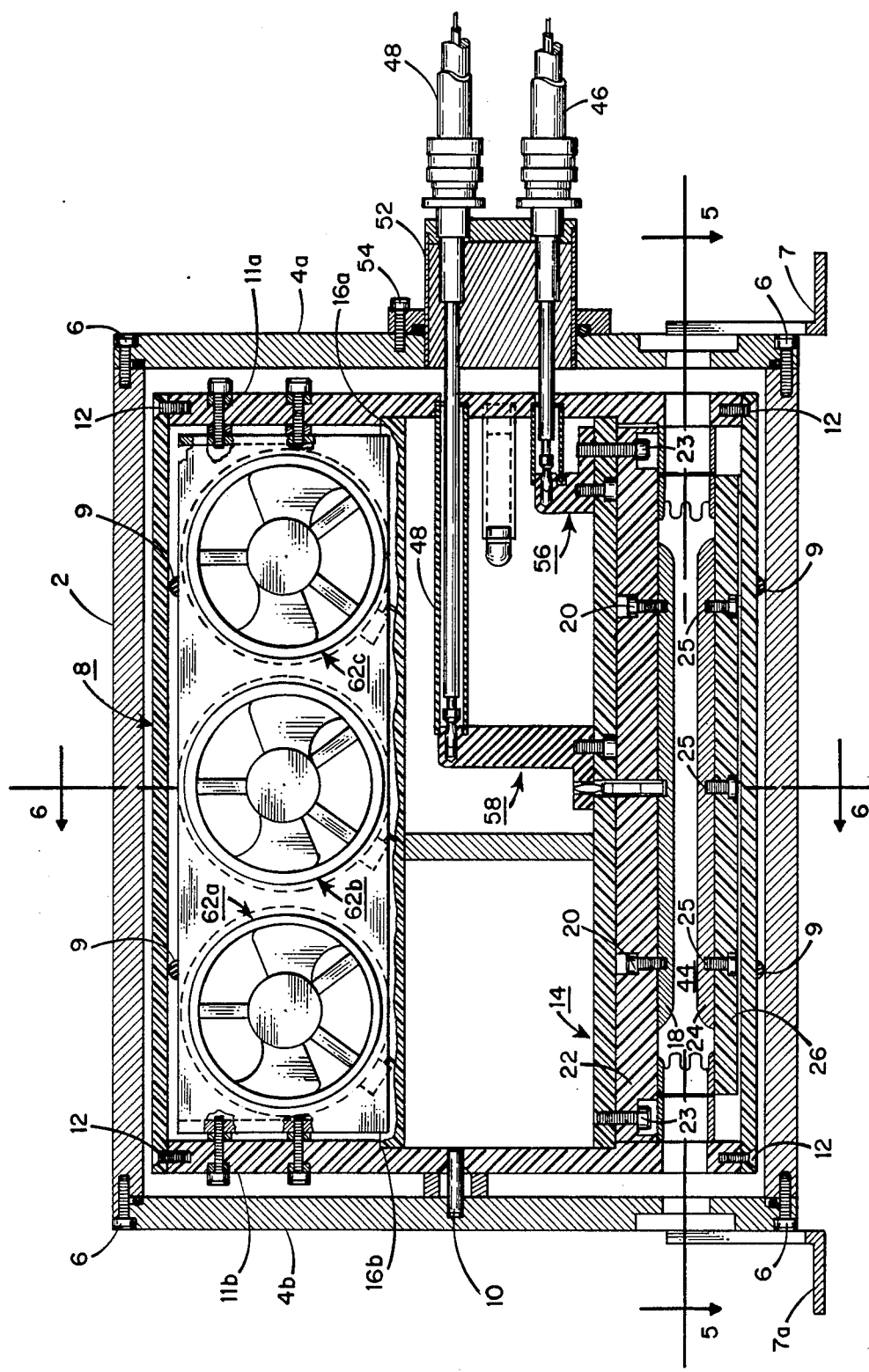
FIG. 4 is a longitudinal section through the plasma chamber of the laser of FIG. 1.

The plasma chamber is enclosed by an outer cylindrical metal shell 2, formed for example of anodized aluminum. The shell 2 (FIG. 4) is closed by two end plates, generally indicated at 4a and 4b, which are secured to the shell 2 by screws 6 or other means. The laser is supported on a suitable mounting surface by brackets 7 and 7a attached to the plates 4a and 4b. Within the shell 2, a baffle cylinder, generally indicated at 8, is mounted concentrically with and spaced from the shell 2. This cylinder 8 is formed of acrylic plastic, or other insulating material, and is positioned by a number of spacers 9, in the form of feet made of rubber or other resilient material, interposed between the outer surface of the cylinder 8 and the inner surface of the shell 2. Further positioning and support is provided by two location pins, such as the one shown at 10 in FIG. 4, which extend respectively from the end plates 4a and 4b into two plastic end plates 11a and 11b which form the ends of the baffle cylinder 8 to which they are secured by screws 12.

Mounted within the baffle cylinder 8 is a support cylinder, generally indicated at 14, also formed of acrylic plastic or other suitable material, that supports certain of the operating components. This support cylinder is retained in position by circular cup-shaped cutouts, as indicated at 16a and 16b, in the end plates 11a and 11b. The longitudinal axis of the support cylinder is offset from the longitudinal axis of the baffle cylinder so that maximum velocity of the gas is produced in the area where the spacing between the two cylinders is minimum. Advantageously, both cylinders 8 and 14 are right circular cylinders but other cylinders or shapes may be used.

An anode 18 extends longitudinally between the two cylinders and is secured by screws 20 to a plastic bar 22 that is in turn secured by screws 23 to the outer perimeter of the support cylinder 14. Opposing and spaced from the anode 18 is a cathode 24 secured by screws 25 to to a mounting strip 26 that is in turn secured to the support cylinder 14.

Figure 5:
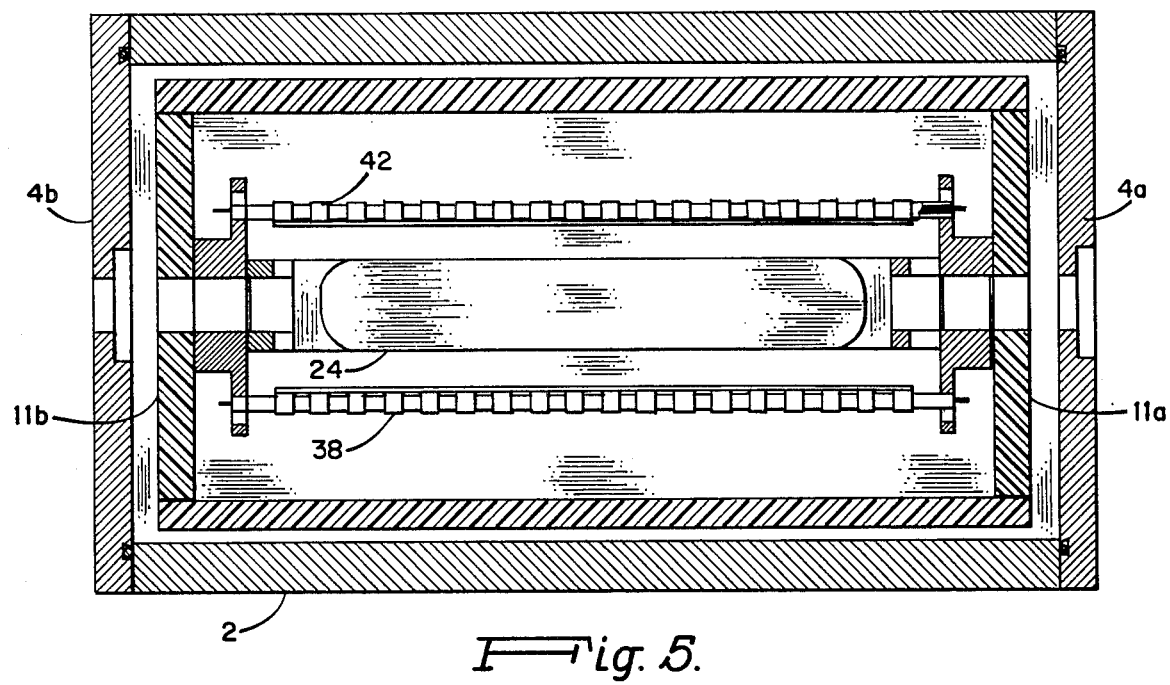
FIG. 5 is a sectional view along line 5—5 of FIG. 4.

A pair of rod type pre-ionizer electrodes 38 and 42 (see also FIG. 5) are positioned symmetrically along either side of the longitudinal gap, generally indicated at 44, formed between the anode 18 and the cathode 24. A series of spark emissions are generated at regular intervals along each of the pre-ionizer electrodes which function in a manner well known in the art. Pre-ionizing voltage is fed to the electrodes 38 and 42 from a cable 46, and voltages for the anode 14 and the cathode 24 are supplied from a cable 48. Both of these cables extend through a connector block 52 that is secured to the metal end plate 4a by screws 54. The conductors of the cable 46 engage a plug-in receptacle, generally indicated at 56, which is secured to the inner surface of the support cylinder 14 and is connected by suitable conductors (not shown) to each end of the respective preionizer electrodes 38 and 42. The conductors of the cable 48 engage a plug-in receptacle, generally indicated at 58, that is appropriately connected to the anode 18 and the cathode 24.

Figure 6:
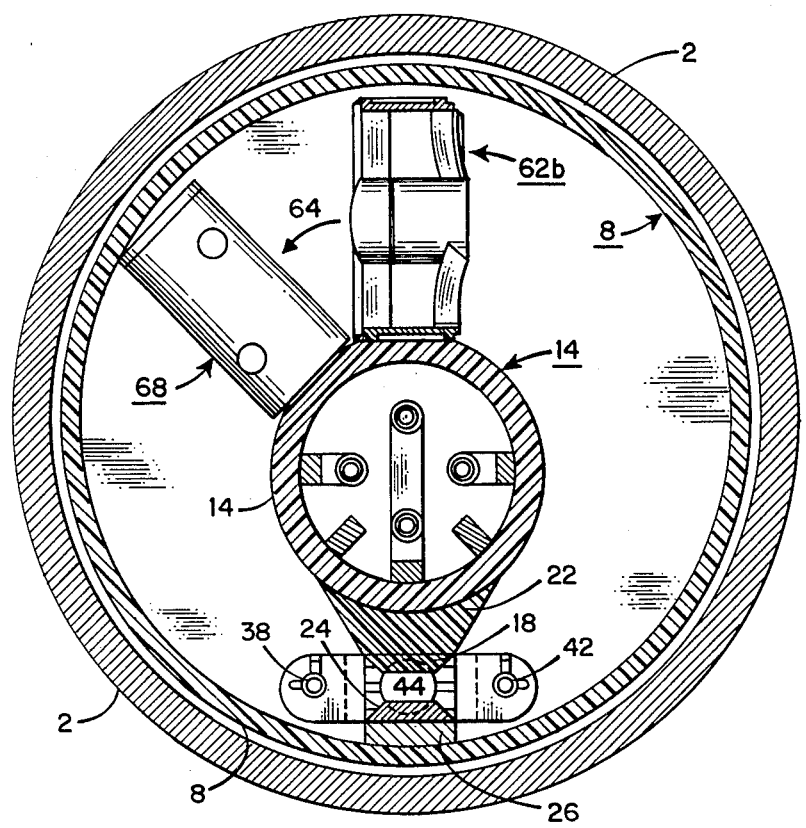
FIG. 6 is a sectional view along line 6—6 of FIG. 4.

Three high-speed fans, generally indicated at 62a, 62b and 62c, with blades positioned in a plane perpendicular to the diameters of the two plastic cylinders 8 and 14, are mounted on the outer top surface of the support cylinder 14 and are arranged to force gas through the annular path around the space between the cyclinders 8 and 14 as indicated by the arrow 64 (FIG. 6). These fans have two functions: The first is to maintain a constant flow of fresh gas between the anode 18 and the cathode 24 at a rate sufficient to remove any decomposed or heated gas from the space between the electrodes and replace it with fresh gas before the next pulse occurs, and to provide a pressure differential sufficient to force a continuous small quantity of the gas through a conventional gas regeneration system (not shown).

The increased pressure of the gas immediately after passing through the fans 62 forces a small quanitity of the gas through an outlet 65 (FIG. 2) into the gas regeneration system. This gas, after being regenerated by conventional methods using known catalysts, is returned through an inlet orifice 66 connected to the space between the cylinders 8 and 14 on the low-pressure side of the fans 62. Because a high gas velocity is necessary for the high pulse rate operation, the fans 62 are powered from a 400 hertz source to provide maximum flow velocity in the available space. A conventional heat exchanger, generally indicated at 68, is provided to cool the circulating gas.

If, because of failure or other reason, it is desired to remove the electrode assembly, the screws 6 are removed to release the end plate 4a. The entire inner assembly may then be withdrawn or, after partial withdrawal, the end plate 11a may be removed by removing the screws 12 and the inner support cylinder 14 withdrawn carrying with it the entire electrode assembly and the circulation fans 62.

Although lasers of this general type may make use of various single or multiple gases, the preferred gas for this embodiment is carbon dioxide. When a laser of this type is operating at relatively high power and with a high pulse repetition rate, the vibration and noise emission can be intense. The outer plastic cylinder 8, in conjunction with the rubber feet 9, serves as an acoustic and vibration baffle. The two cylinders serve further to define an annular path for the rapid flow of gas between the electrodes. This constant changing of the gas between the electrodes removes decomposition products between successive pulses permitting a significantly higher pulse rate than would otherwise be possible. The continuous regeneration of a portion of the gas permits closed cycle operation for periods of time up to several hours. In the continuous gas feed mode, a fresh supply of gas is fed continuously through the plasma chamber. However, by use of the gas regeneration system as shown even with continuous gas feed, the rate at which gas must be fed through the chamber is materially reduced. A practical embodiment of the laser described here is capable of continuous operation at pulse rates up to 250 Hertz. The outer aluminum shell is electrically isolated from both of the high-voltage electrodes 18 and 24 so that no plasma dischage current flows through the shell 2 thus minimizing the generation of electromagnetic interference and providing maximum operational safety.

I claim:

1. In a gas laser having a resonant cavity, an active gas medium, and energy extracting means, the combination comprising
   a generally cylindrical baffle formed of insulating material positioned within and spaced from an outer shell of said cavity,
   a generally cylindrical support formed of insulating material positioned within said baffle,
   means for circulating said gas medium around an annular path between said baffle and said support,
   a cathode and an anode mounted in spaced opposing relationship in said annular path, and
   power supply means having a conductive circuit applying a high voltage to said anode and cathode and thereby produce a transverse electrical discharge therebetween.

2. The combination as claimed in claim 1 including
   a plurality of spaced resilient members positioned between said outer shell and said baffle to provide a resilient support for said baffle.

3. The combination as claimed in claim 1 wherein said cathode and said anode are mounted on and supported by said support.

4. The combination as claimed in claim 3 wherein
   said outer shell is formed of conductive material and electrically isolated from the said conductive path that provides high voltage to said anode and said cathode.

5. The combination as claimed in claim 4 wherein
   said conductive path includes two connectors each having a first and a second releasable section, the first section of each of said connectors being mounted on said support.

6. The combination as claimed in claim 5 including
   releasable means supporting said support within said baffle.

7. In a gas laser having a resonant cavity, a gas medium, and energy extracting means, the combination comprising
   an outer cylinder formed of electrically conductive material,
   a generally cylindrical baffle formed of non-conductive material positioned within said outer cylinder,
   a plurality of spacers positioned between said baffle and said outer cylinder and arranged to maintain said baffle in spaced relationship from said outer cylinder,
   a generally cylindrical support mounted within and spaced from said baffle,
   high voltage discharge apparatus mounted on the outer surface of said support including an anode, a cathode, and releasable circuit means connected to said anode and said cathode,
   a source of high voltage power, and
   circuit means independent of said outer cylinder connecting said source of high voltage to said high voltage apparatus.

* * * * *